W. H. PRINZ.
METHOD OF STEEPING GRAIN FOR MALTING.
APPLICATION FILED OCT. 28, 1907.
994,786.
Patented June 13, 1911.
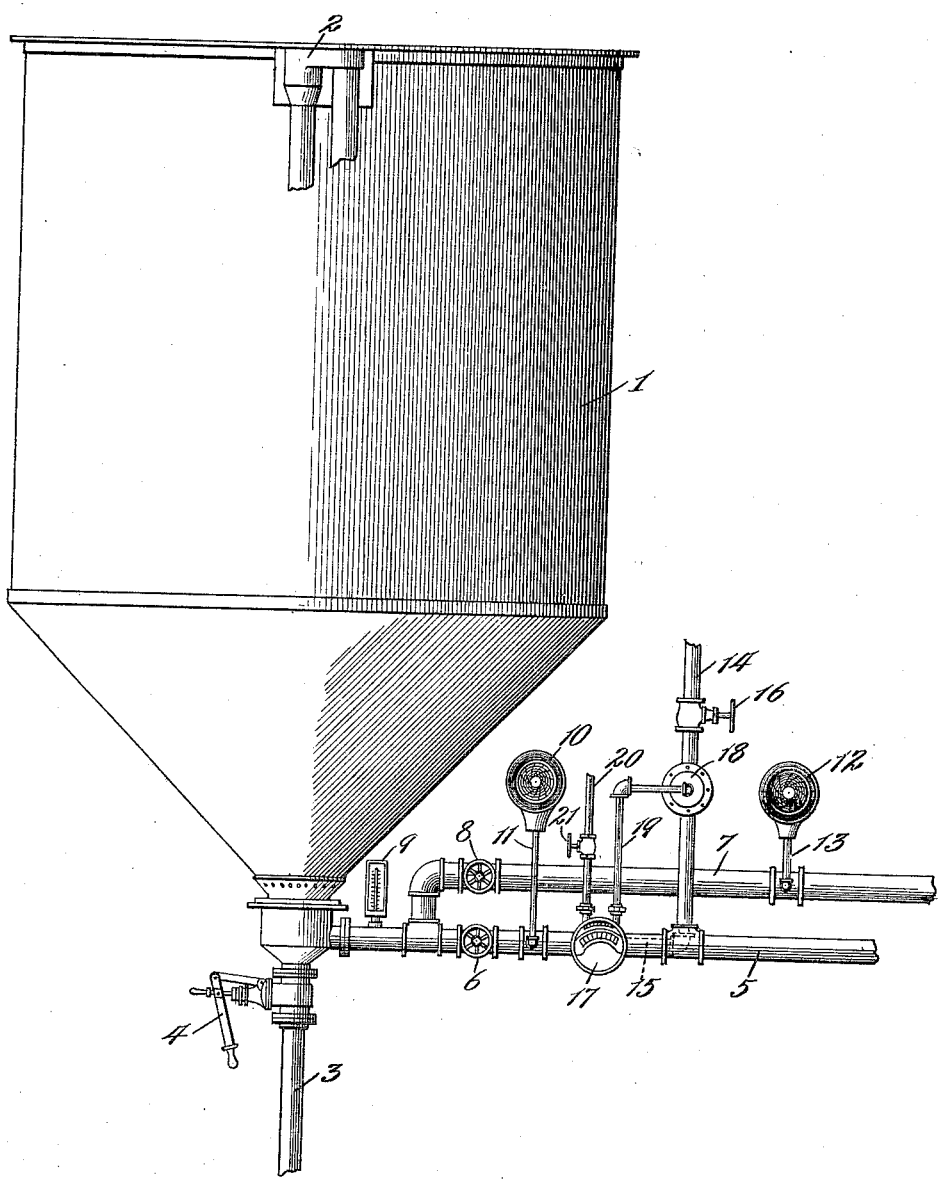

UNITED STATES PATENT OFFICE.

WILLIAM H. PRINZ, OF OAK PARK, ILLINOIS, ASSIGNOR OF ONE-THIRD TO HIMSELF, AND ONE-THIRD TO CHARLES A. PLAMONDON, OF CHICAGO, ILLINOIS, AND ONE-THIRD TO GEORGE PLAMONDON, OF WHEATON, ILLINOIS.

METHOD OF STEEPING GRAIN FOR MALTING.

994,786.  Specification of Letters Patent.  Patented June 13, 1911.

Application filed October 28, 1907. Serial No. 399,399.

*To all whom it may concern:*

Be it known that I, WILLIAM H. PRINZ, a citizen of the United States, residing at Oak Park, in the county of Cook and State of Illinois, have invented a certain new and Improved Method of Steeping Grain for Malting, of which the following is a specification, reference being had to the accompanying drawings.

My invention relates to malting, and has particularly to do with the steeping of the grain preparatory to germination.

Heretofore in steeping it has been the practice to use water at a uniform temperature during the entire process. While this practice has produced good results when mellow barley was used, when hard or flinty barley was used good malt could not be produced, since the grain could not be adequately steeped in the requisite time without using water at a higher temperature in steeping, and with the use of steep water at the higher temperature the barley reached the growing floors, compartments or drums at too high a temperature to permit the much desired after-steeping or couching to be carried on. If the grain is put into the malting compartments or drums warm, it begins to germinate at once and the after-steeping or couching is not obtained; but where the grain is cold when put into the compartments it does not germinate at once and consequently the moisture taken up during the steeping process is permitted to permeate the grain more thoroughly and become more uniformly disseminated throughout the mass with the result that the grain germinates more uniformly.

The object of my invention is to provide a process by which the grain may be delivered to the growing floors, compartments or drums cold enough to insure the carrying on of the after-steeping above referred to so that the maltster will be able to produce as good malt from hard or flinty barley as from mellow barley, with a great saving in time and labor.

To this end my invention consists in first steeping the barley in warm water, and before it is ready to be loaded on the growing floors, compartments or drums, cooling it with cold water so that the entire mass is reduced to a temperature which will defer its germination sufficiently to permit the grain to become uniformly steeped by the after-steeping process.

In practice the barley is placed in a suitable tank or receptacle and steeped in warm water, by which I mean water at a temperature of from sixty-five degrees Fah. up to one hundred degrees Fah. By thus using warm water the grain is softened much more quickly and is consequently saturated more thoroughly in a given time than can be done with cold water. When the steeping operation has been carried on almost to the point where the grain should be removed to the germinating floors or compartments, which is usually determined by the percentage by weight of moisture which it has taken up, the warm water is drawn off and cold water, by which I mean water at a temperature of approximately sixty degrees Fah. or less, is admitted until the grain is cooled sufficiently to retard germination. The time required for this latter step of the process is about two hours.

A further feature of my invention consists in employing cold water to regulate the steeping of the grain. For example, if the grain takes on moisture too fast, cold water is introduced to cool it, whereas if the grain does not take on moisture fast enough the temperature of the water is raised. For example, for eight-day germination the grain should take up about fifty per cent. by weight of moisture, and by my improved process this can be very accurately regulated. After the grain has been properly steeped the water is drawn off and the grain transferred to the germinating floors, compartments or drums, where the after-steeping is carried on, and at the proper time air is introduced to carry on the germination of the grain.

In the accompanying drawing I have illustrated one form of apparatus for carrying out my improved process,—the figure being an elevation of the steep-tank with the connections and appliances employed to regulate the temperature of the water supplied thereto.

Referring to the drawing,—1 indicates a steep-tank provided with an overflow 2.

3 indicates a discharge pipe controlled by a valve 4,—said pipe leading to the malting compartments.

5 indicates a warm-water pipe, which communicates with the lower portion of the steep-tank for supplying warm water thereto. Said pipe is provided with a valve 6 by which the flow of water therethrough may be controlled.

7 indicates a cold-water pipe, which connects with the hot-water pipe 5 at a point between the valve 6 and the steep-tank,—said cold-water pipe having a valve 8 for controlling the flow of water therethrough.

9 indicates a thermometer in the hot-water pipe 5 between the steep-tank and the point of connection with said pipe of the cold-water pipe 7.

10 indicates a registering thermometer connected with the hot-water pipe 5 by a pipe 11. 12 indicates a similar thermometer connected with the cold-water pipe 7 by a pipe 13.

14 indicates a steam pipe having a nozzle 15 within the hot-water pipe 5 and directed toward the steep-tank, as shown in dotted lines in the drawing.

16 indicates a valve in the steam pipe 14.

17 indicates a thermostatic-controlled valve connected with the hot-water pipe 5 and operating to control the diaphragm valve 18 in the steam pipe 14,—said thermostatic-controlled valve being connected with the valve 18 by a pipe 19.

20 indicates an air-pipe having a valve 21 for supplying compressed air to the thermostatic-controlled valve 17 to operate the same.

The operation is as follows: The valve 6 and the warm-water pipe 5 being open and the valve in the cold-water pipe closed, warm water may be admitted to the steep-tank, its temperature being registered by the thermometers 9—10. The temperature of the water in the pipe 5 is controlled by the thermostatic-controlled valve 17, which is set for the temperature at which it is desired to maintain the water in said pipe 5. If the temperature falls below that point, the valve 17 operates to open the diaphragm valve 18 and admit steam to the pipe 5 until the temperature is raised to the proper point, when the valve 18 is automatically closed. The construction of the thermostatic-controlled valve is not shown or described as said construction forms no part of my present invention, and any suitable valve of the kind may be employed. If the water in the pipe 5 is too warm, it may be cooled by opening the valve 8 and admitting sufficient cold water for the purpose,—the thermometer 9 indicating when the proper temperature has been reached. When cold water is to be introduced into the steep-tank the valve 6 is closed and the valve 8 opened, allowing water from the pipe 7 to enter the steep-tank. Should the cold water be too cold, it may be warmed by opening the valve 6 sufficiently. It will thus be seen that the temperature of the water in the steep-tank may be at all times accurately controlled, and that the apparatus described is well adapted for use in practicing my improved method hereinbefore described. I do not, however, limit myself to using such apparatus in practicing said method, as any other suitable apparatus may be employed.

That which I claim as my invention, and desire to secure by Letters Patent, is,—

1. The method of steeping grain, which consists in subjecting it to the action of warm water until near the close of the steeping operation and then steeping it in cold water.

2. The method of steeping grain, which consists in subjecting it to the action of warm water until near the close of the steeping operation, then steeping it in cold water, and then after-steeping it.

WILLIAM H. PRINZ.

Witnesses:
JOHN L. JACKSON,
WILLIAM H. DE BUSK.